Nov. 10, 1942. T. E. HYNEK 2,301,180
FLAG HOLDER
Original Filed Jan. 31, 1941
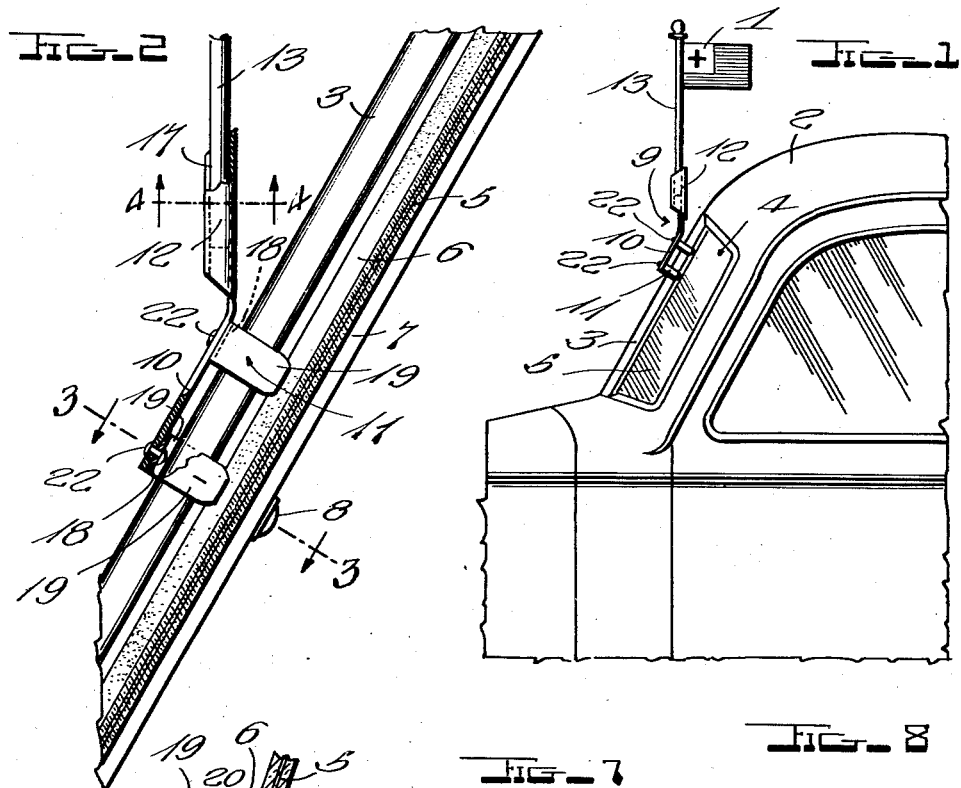
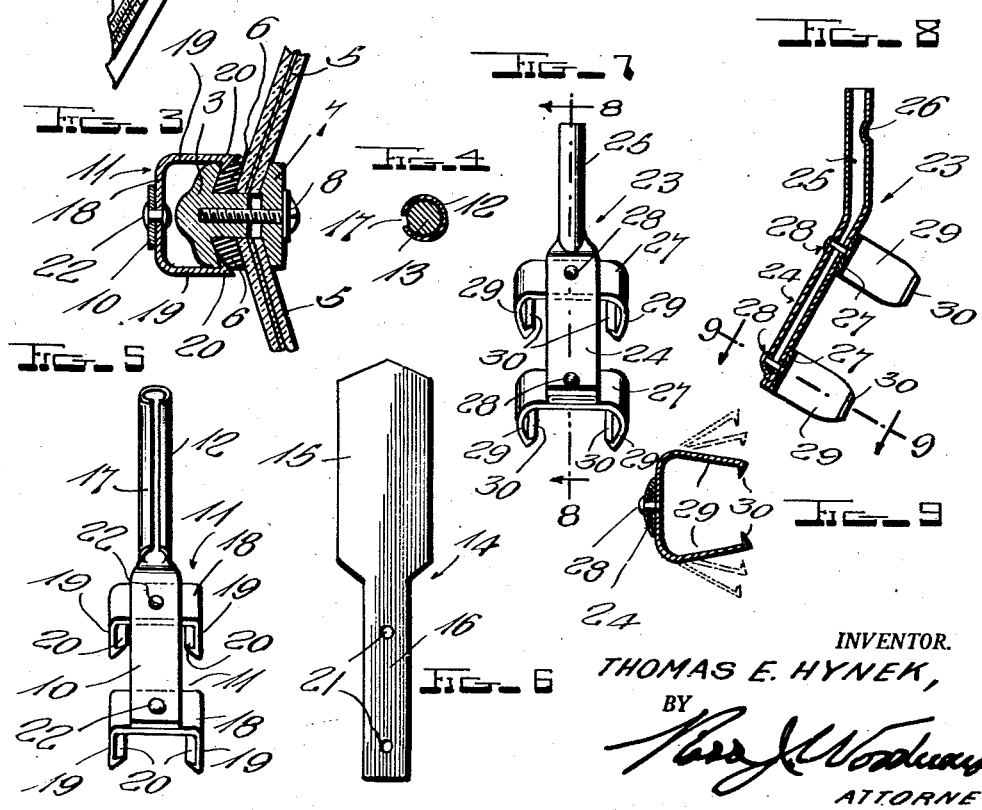
INVENTOR.
THOMAS E. HYNEK,
BY
ATTORNEY Patented Nov. 10, 1942

2,301,180

UNITED STATES PATENT OFFICE 2,301,180

FLAG HOLDER

Thomas E. Hynek, Chico, Calif.

Original application January 31, 1941, Serial No. 376,905, now Patent No. 2,292,523, dated August 11, 1942. Divided and this application October 6, 1941, Serial No. 413,902

5 Claims. (Cl. 248—41)

This invention relates to a flag holder adapted to be applied to the center bar or partition of the windshield of an automobile, the present application being a division of my copending application filed January 31, 1941, Serial No. 376,-905 now Patent No. 2,292,523, August 11, 1942.

One object of the invention is to provide a flag holder which is formed of resilient metal and is so constructed that it may be applied to the center bar or partition of a windshield in such position that it will be in front of the center bar and not obstruct the view of the driver of the automobile.

Another object of the invention is to so form the flag holder that it may be easily applied to the center bar in gripping engagement therewith and be adjusted along the bar to a position in which the flag carried by the holder will be prominently displayed in an attractive manner.

Another object of the invention is to provide a flag holder formed of resilient sheet metal and capable of being manufactured at small cost and sold at a low price.

In the accompanying drawing:

Fig. 1 is a side elevation showing a flag holder of the improved construction applied to the center bar of the windshield of an automobile.

Fig. 2 is a view on an enlarged scale showing the flag holder applied to the center bar of the automobile windshield, the view being principally in side elevation and partially in section.

Fig. 3 is a sectional view taken transversely through the base of the flag holder and the center bar of the windshield, the view being on the line 3—3 of Fig. 2.

Fig. 4 is a sectional view taken transversely through the flag holder on the line 4—4 of Fig. 2.

Fig. 5 is a perspective view of the flag holder.

Fig. 6 is a view of the blank from which the holder is formed.

Fig. 7 is a perspective view of a modified form of flag holder.

Fig. 8 is a sectional view taken longitudinally through the modified form of holder, on the line 8—8 of Fig. 7.

Fig. 9 is a sectional view taken transversely through the modified form of flag holder, on the line 9—9 of Fig. 8.

This flag holder is designed to support a flat at the front of an automobile 2 and the flag holder is so formed that it has gripping engagement with the center bar 3 of the windshield 4. The windshield is of conventional formation and has its glasses 5 held in compressing engagement with packing 6 by a backing strip 7 disposed at the rear of the center bar and secured by a suitable number of screws 8. When the screws are tightened, the packing is compressed and watertight seals formed about the edges of the glasses. It is understood that this merely illustrates a windshield having a center bar of one specific type to which the flag holder may be applied.

The flag holder 9 has a base 10 carrying clamps 11 for gripping the center bar and, at the upper or rear end of the base, is an upright socket 12 into which the staff 13 of the flag fits. The base and socket are formed from the blank 14 of resilient sheet metal shown in Fig. 6, and, referring to this figure, it will be seen that the blank has a wide end portion 15 from which the socket 12 is formed and a narrow end portion 16 from which the base 10 is formed. The wide end portion is rolled to form the socket and its side edges terminate in spaced relation to each other, as shown in Figs. 4 and 5, thus providing the socket with a longitudinally extending slot 17 and permitting the socket to expand and contract. Therefore, a flag staff of slightly greater diameter than the socket may be thrust downwardly into the socket and, since the socket will be expanded somewhat as the flag staff is inserted, contraction of the socket will cause it to grip the staff and frictionally hold it against turning or vertical sliding movement in the socket.

The clamps 11 are formed from strips of resilient sheet metal which are bent to provide each clamp with a bridge 18 and side arms 19 formed integral with the bridge and terminating at their free ends in inwardly extending lips 20. The lips taper as shown in Figs. 3 and 5, to provide sharp edges for permitting the lips to easily engage between the packings and side edge portions of the center bar and also allow the arms or jaws of the clamps to be spread apart and snap into place under side edges of the center bar as the clamps are thrust into place in straddling relation to the center bar. Resiliency of the clamps causes their arms to tightly grip the center bar and firmly but adjustably hold the flag holder in set position upon the center bar. Openings 21 are formed through the narrow end portion of the blank so that the base 10 formed thereby may be secured on the bridge portions of the clamps by rivets 22, and the blank is so bent at the inner end of the base-forming portion, that the socket extends upwardly therefrom in a vertical plane when the clamps are applied to the center bar of the windshield. The fact that the clamps are formed of resilient metal not only causes them to firmly grip the center bar but also permits them to accommodate themselves to center bars of different widths. The bracket or flag holder is preferably applied to the center bar in such manner that the socket extends upwardly above the windshield, as shown in Fig. 1, and since the base is of appreciably less width than the center bar, it will be hidden from the driver of the automobile and not constitute an obstruction which might interfere with clear vision.

In Figs. 7, 8 and 9 of the drawing, there has been shown a bracket or flag holder 23 of modified construction. In this embodiment of the invention, the socket and its base are formed from a metal tube which has its lower or forward portion flattened to form the base 24 and is then bent upwardly at the inner end of the base to provide a vertically disposed socket 25. A portion of the tube forming the socket is projected inwardly by pressing or punching to form a rounded lug 26 for gripping the flag staff and frictionally holding it against slipping downwardly through the socket when the flag staff is thrust into the socket through the open upper end thereof. The clamps 27 which are secured against the under face of the base by rivets 28, are formed of strips of resilient metal and have depending side arms which normally converge downwardly and terminate in inwardly extending lips 30 for engaging between side edge portions of a center bar of a windshield and packing for the windshield glasses, when the flag holder is applied to the center bar.

Having thus described the invention, what is claimed is:

1. A flag holder comprising a bracket having a flat base and a tubular socket extending upwardly from one end of said base and open at its upper end and adapted to grip and hold a flag staff thrust into the socket through the open upper end thereof, and resilient U-shaped clamps secured against the under face of said base and extending transversely thereof in spaced relation to each other with portions projecting from opposite side edges of the base and provided with depending arms extending downwardly in converging relation to each other and terminating in inwardly extending lips at their lower ends for engaging under side edge portions of a bar straddled by the clamps with their arms gripping opposite edges of the bar, under faces of the lips extending at an incline and constituting cam surfaces for spreading the arms as the clamps are forced into engagement with the center bar.

2. In a flag holder, a bracket having a flat base and a tubular socket extending upwardly from one end of said base and open at its upper end, the socket and the base consisting of a strip of resilient sheet metal having a narrow portion constituting the base and a wide portion rolled transversely to form the socket and having its side edges spaced from each other to provide the socket with a slit extending longitudinally of the socket the full length thereof and permitting expansion of the socket as a flag staff is thrust into the socket and subsequent contraction of the socket for gripping the socket.

3. A flag holder comprising a bracket formed from a tube having a portion constituting a socket open at its upper and lower ends and a tongue extending from the lower end of the socket in crossing relation thereto and constituting a base for the socket, and clamps carried by the base transversely thereof and extending from the base in position to grip the center bar of a windshield and mount the bracket longitudinally of the center bar with the socket projecting upwardly in front of the center bar.

4. A flag holder comprising a tube constituting a socket open at its upper end and having its lower portion flattened and bent transversely of the tube to form a base extending from the lower end of the socket diagonally thereof with a portion disposed under the open lower end of the socket, and U-shaped clamps carried by the base, each clamp being formed of resilient material and having a bridge portion and arms extending from ends of its bridge, said clamps having their bridge portions secured flat against the under face of the base transversely thereof with their arms extending downwardly from the base in spaced relation to opposite sides thereof in position to grip a center bar of a windshield from opposite sides thereof and mount the bracket longitudinally of the center bar.

5. A flag holder comprising a bracket comprising a sheet metal tube constituting a socket open at its upper end and flattened for a portion of its length from its lower end and bent at the inner end of its flattened portion to form a base for the socket, and clamps carried by the base in spaced relation to each other longitudinally thereof and each being formed of resilient metal and having a bridge portion and arms extending from ends of its bridge, said clamps having their bridge portions secured against the under face of the base transversely thereof with their arms extending downwardly therefrom in converging relation to each other for gripping engagement with opposite sides of a center bar of a windshield, and lips extending inwardly along free lower ends of the arms for engaging under side portions of the center bar of a windshield and firmly holding the arms in gripping engagement with the center bar, said lips having lower faces constituting cam surfaces for spreading the arms as the arms are forced into engagement with the center bar.

THOMAS E. HYNEK.